(12) United States Patent
Lee

(10) Patent No.: US 10,131,324 B2
(45) Date of Patent: Nov. 20, 2018

(54) SPLINE FOR USE IN A WIPER ASSEMBLY

(71) Applicant: ALBEREE PRODUCTS, INC., Halethorpe, MD (US)

(72) Inventor: Albert Lee, Halethorpe, MD (US)

(73) Assignee: ALBEREE PRODUCTS, INC., Halethorpe, MD (US)

(*) Notice: Subject to any disclaimer, the term of this patent is extended or adjusted under 35 U.S.C. 154(b) by 81 days.

(21) Appl. No.: 14/951,147

(22) Filed: Nov. 24, 2015

(65) Prior Publication Data

US 2017/0144633 A1  May 25, 2017

(51) Int. Cl.
*B60S 1/38* (2006.01)

(52) U.S. Cl.
CPC ............. *B60S 1/38* (2013.01); *B60S 1/3801* (2013.01); *B60S 2001/382* (2013.01); *B60S 2001/3841* (2013.01)

(58) Field of Classification Search
CPC .... B60S 1/3801; B60S 1/3874; B60S 1/3875; B60S 1/3877; B60S 1/3879; B60S 2001/3812; B60S 2001/3817; B60S 2001/382; B60S 1/38
USPC ..................... 15/250.451, 250.452
See application file for complete search history.

(56) References Cited

U.S. PATENT DOCUMENTS

| | | | | |
|---|---|---|---|---|
| 2,901,761 A * | 9/1959 | Wallis | ............... | B60S 1/3801 |
| | | | | 15/250.47 |
| 3,659,310 A * | 5/1972 | Rosen | ............... | B60S 1/38 |
| | | | | 15/250.452 |
| 3,696,497 A | 10/1972 | Quinlan et al. | | |
| 3,899,800 A * | 8/1975 | Wittwer | ............... | B60S 1/3801 |
| | | | | 15/250.44 |
| 5,598,603 A | 2/1997 | Mege et al. | | |
| 5,697,156 A | 12/1997 | Buechele | | |
| 5,713,100 A | 2/1998 | Samartgis | | |
| 5,964,025 A | 10/1999 | Buechele | | |
| 6,185,805 B1 | 2/2001 | Rosiere et al. | | |
| 7,159,269 B2 | 1/2007 | Lee | | |
| 7,690,116 B2 * | 4/2010 | Lee | ............... | B60S 1/38 |
| | | | | 15/250.451 |

FOREIGN PATENT DOCUMENTS

| | | | |
|---|---|---|---|
| DE | 3208749 | * | 10/1982 |
| EP | 0380360 | * | 8/1990 |
| EP | 0 455 480 A1 | | 11/1991 |
| EP | 0667266 | * | 8/1995 |
| GB | 2 051 563 A | | 1/1981 |
| GB | 2 292 672 A | | 3/1996 |

\* cited by examiner

*Primary Examiner* — Gary Graham
(74) *Attorney, Agent, or Firm* — Birch, Stewart, Kolasch & Birch, LLP

(57) ABSTRACT

A spline for use in a windshield wiper assembly including a wiping element is provided. The spline is composed of a pair of elongate strips, and each strip includes a first curved portion having at least one pointed protrusion to penetrate the wiping element, a notched portion having a notch, a second curved portion provided at a side of the elongate strip, and a body portion to seat within the wiping element. An overall shape of the spline is convex or concave with a bottom surface of the spline directed toward a wiping lip of the wiping element.

14 Claims, 8 Drawing Sheets

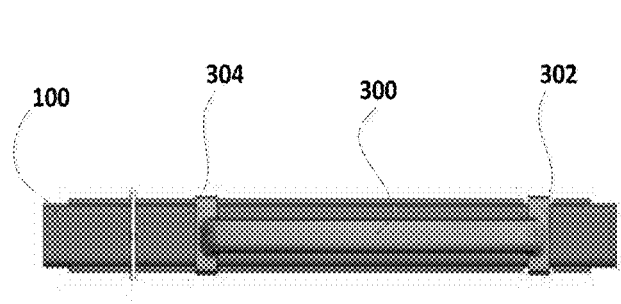
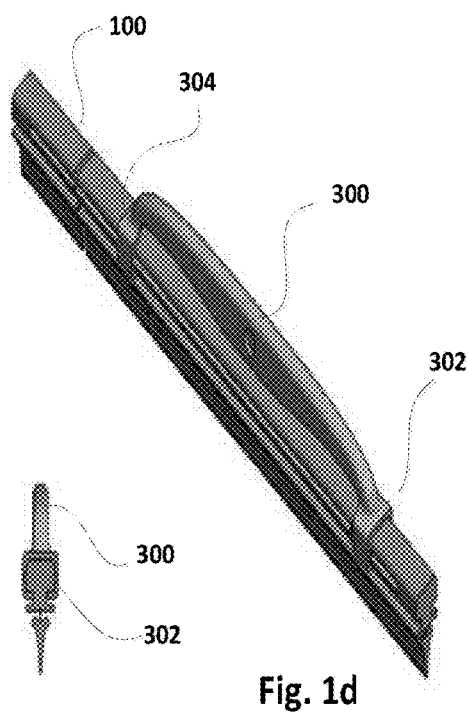
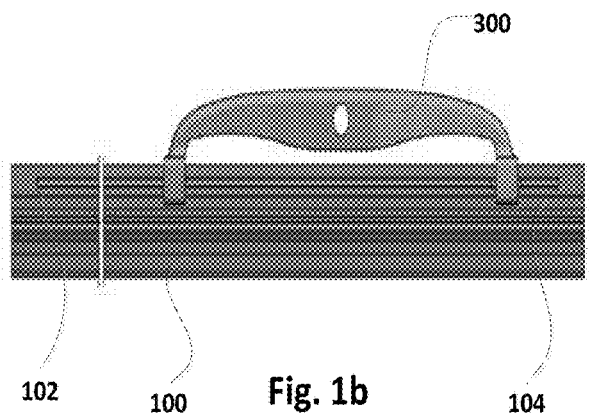
Fig. 1a
Fig. 1b
Fig. 1c
Fig. 1d

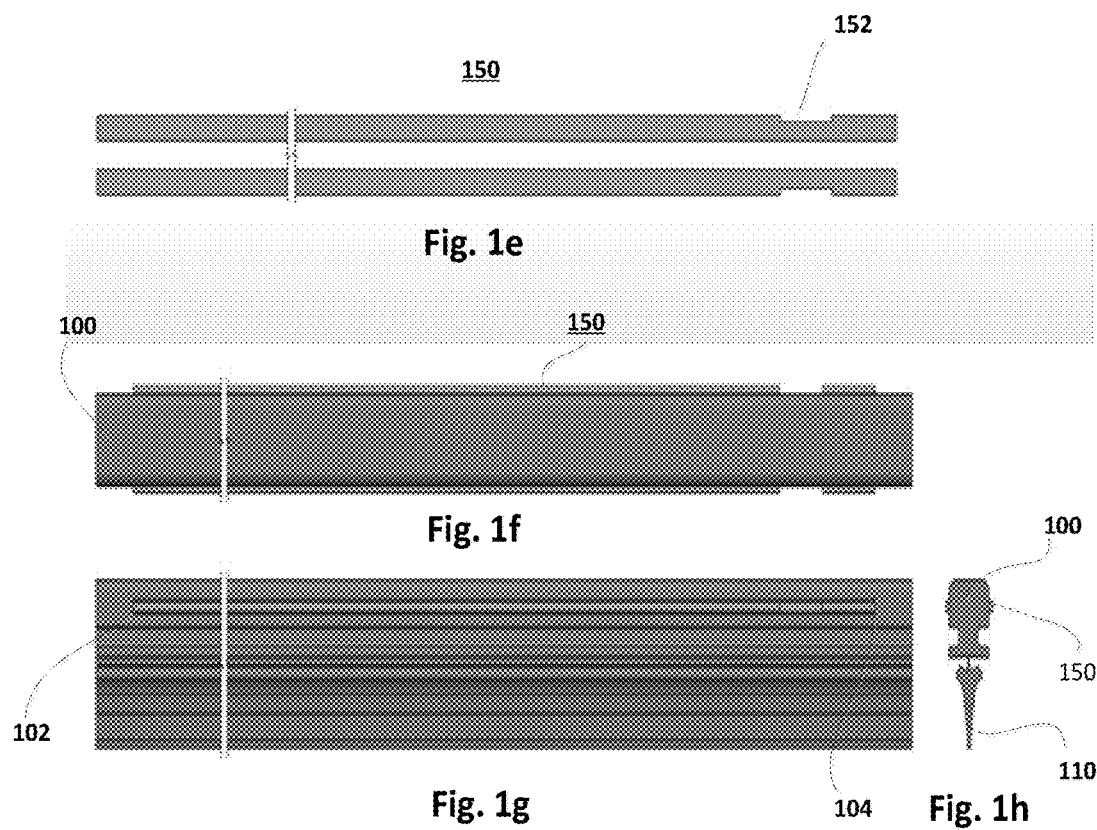

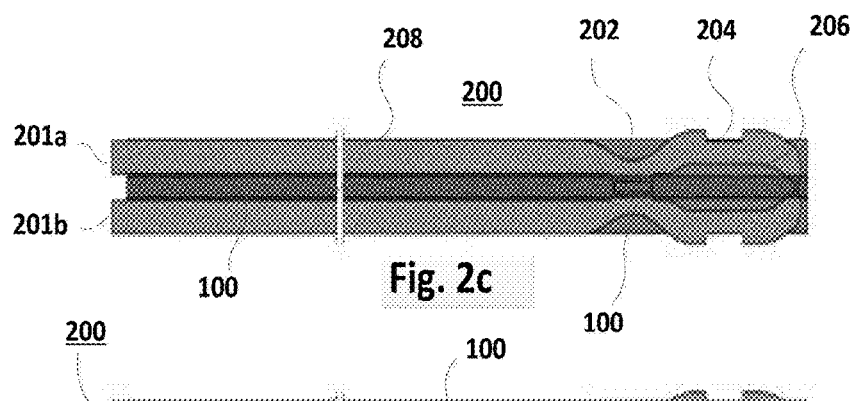
Fig. 2c
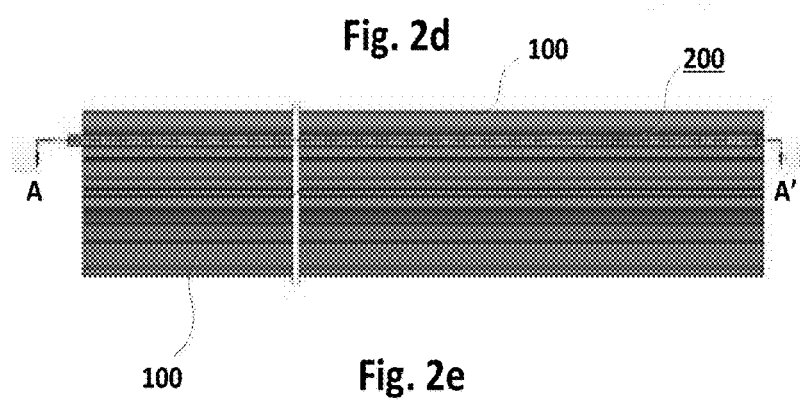
Fig. 2d
Fig. 2e
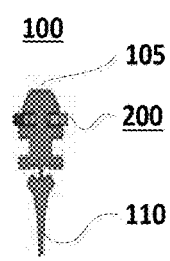
Fig. 2f

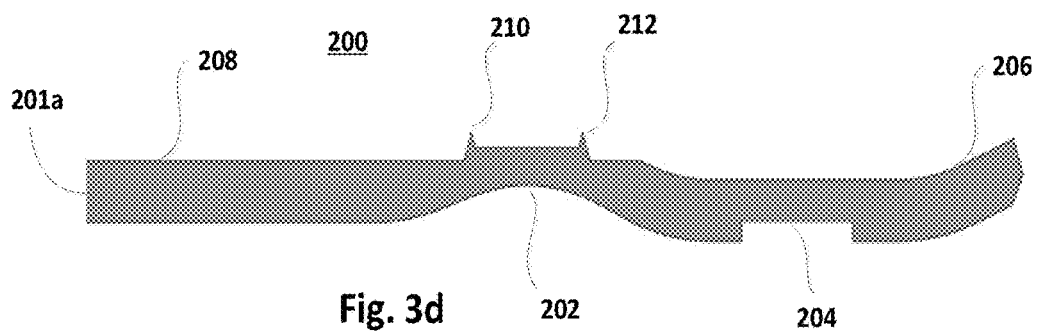
Fig. 3d
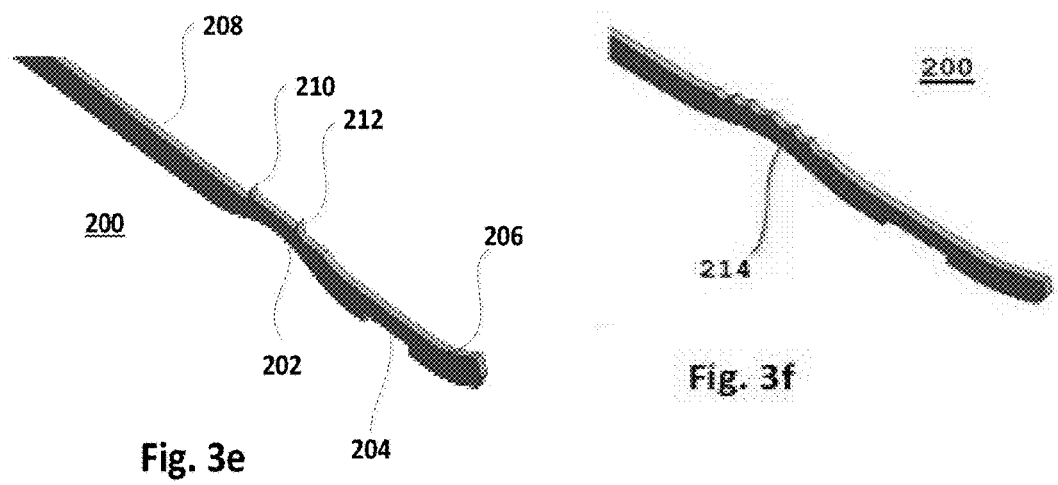
Fig. 3e
Fig. 3f

200

SPLINE FOR USE IN A WIPER ASSEMBLY

BACKGROUND OF THE INVENTION

Field of the Invention

The present disclosure relates to a spline for use in a wiper assembly, and more particularly to improvements in a spline for use in a windshield wiper assembly.

Description of Related Art

A windshield wiper generally comprises a wiping element typically made of an elastic material like rubber, a spline composed of a pair of elongate strips disposed in grooves or longitudinally extending recesses provided in an upper portion of the wiping element, and a component of a frame having at least one claw which partially surrounds the spline in the upper portion of the wiping element for retaining the wiping element in cooperation with the spline.

A spline for retaining the wiping element in a windshield wiper assembly is generally known as a backing strip, spine or vertebra. One of the simplest splines is a rectangular-shaped strip with only one deformation along the axis of the strip to secure it with a claw of the component. This kind of spline generally works well for the wiping element formed by an injection molding or a compression molding process because these processes allow both ends 102/104 of the grooves to be closed, maintaining a pocket to retain the spine as illustrated in FIG. 1*b*.

However, the injection molding or the compression molding process typically involves complicated manufacturing steps and is not suitable for mass production of various types of wiping elements from a cost and productivity perspective. On the other hand, a wiping element made by an extrusion process can be mass produced at a lower cost without employing complicated process steps and expensive dedicated tooling.

However, if the wiping element is produced by the extrusion process, no such closed ends can be formed in the grooves of the wiping element, and such a simple rectangular-shaped strip as mentioned above will not be retained stably in the extruded wiping element.

Accordingly, it is an objective of the present disclosure to overcome these problems by providing a spline having excellent retaining properties of the wiping element for use in a windshield wiper assembly regardless of the production process of the wiping elements.

SUMMARY OF THE INVENTION

The present disclosure is directed to a spline for use in a wiper assembly, and more particularly to improvements in a spline for use in the windshield wiper assembly. The present disclosure is further directed to a method for manufacturing the spline that substantially obviates one or more problems due to limitations and disadvantages of the related art.

An objective of the present disclosure is to provide a spline having excellent retaining properties for use in a windshield wiper assembly that is easier to manufacture at a low cost without employing complex machinery, such that various types of wiping elements can be stably retained by the spline.

Additional advantages, objects, and features of the present disclosure will be set forth in the description which follows and will become apparent to those having ordinary skill in the art upon examination of the following or may be learned from practice of the present disclosure. The objectives and other advantages of the present disclosure may be realized and attained by the structure particularly pointed out in the written description and claims hereof as well as the appended drawings.

In one aspect of the present disclosure, provided is a spline for use in a windshield wiper assembly including a wiping element and a component having a plurality of claws. The spline includes a pair of elongate strips and is adapted to seat within the wiping element. Each elongate strip of the spline includes a first curved portion having at least one pointed protrusion configured to penetrate the wiping element to retain the wiping element between the elongate strips, and a portion having a rectangular-shaped notch adapted to engage with a first claw of the component to retain the wiping element. Each elongate strip further includes a second curved portion provided at a side of the elongate strip and adapted to engage into the wiping element for retaining the wiping element and a body portion extended from the first curved portion and adapted to seat within the wiping element to be engaged with a second claw of the component for retaining the wiping element.

In an embodiment, the first curved portion of the spline having at least one pointed protrusion includes two pointed protrusions formed on opposite ends of the first curved portion. The second curved portion of each elongate strip cooperates with each other to retain the wiping element at opposite sides of the wiping element. The second curved portion of each elongate strip is configured to form another protruded portion that engages the wiping element for retaining the wiping element at the side of the elongate strip by a spring action.

In another embodiment, a curvature can be provided to the spline along the axis of the spline. The extent of the curvature is application specific. An overall shape of the spline is convex or concave with a bottom surface of the spline directed toward a wiping lip of the wiping element.

In another aspect of the present disclosure, provided is a method for forming a spline for use in a windshield wiper assembly. The spline is composed of a pair of elongate strips and for each elongate strip, the method includes providing a blank linear elongate strip, forming a first curved portion by carrying out a first bending operation in a first portion of the elongate strip, carrying out a first material removing operation for forming at least one pointed protrusion on an outer surface of the first curved portion of the elongate strip. The method further includes carrying out a second material removing operation for forming a rectangular-shaped notch in a second portion of the elongate strip and forming a second curved portion by carrying out a second bending operation at a side of the elongate strip. In an embodiment, an overall shape of the spline is convex or concave with a bottom surface of the spline directed toward a wiping lip of the wiping element.

In another embodiment, a radius of curvature of the first curved portion is substantially the same as a radius of curvature of the second curved portion. The second curved portion of each elongate strip is formed in a manner to cooperate with each other to retain the wiping element from opposite sides of the wiping element. The second curved portion of each of the elongate strip is further configured to form another protruded portion that engages the wiping element for retaining the wiping element at the side of the elongate strip by a spring action, thereby improving the retaining properties of the spline.

In another aspect of the present disclosure, provided is a sub assembly for a windshield wiper assembly. The sub assembly includes a wiping element, a component including a first claw and a second claw, and a spline, the spline being composed of a pair of elongate strips and adapted to seat within the wiping element. Each elongate strip includes a first curved portion having at least one pointed protrusion penetrating the wiping element to retain the wiping element between the elongate strips and a notched portion having a rectangular-shaped notch engaging the first claw of the component to retain the wiping element.

Each elongate strip further includes a second curved portion provided at a side of the elongate strip, the second curved portion engaging the wiping element for retaining the wiping element at the side of the elongate strip, and a body portion extended from the first curved portion and seated within longitudinally extending recesses formed in the wiping element, the body engaging the second claw of the component for retaining the wiping element, wherein the notched portion is disposed between the first curved portion and the second curved portion. In an embodiment, an overall shape of the spline is convex or concave with a bottom surface of the spline directed toward a wiping lip of the wiping element.

It is to be understood that the foregoing general description and the following detailed description of the present disclosure are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the present disclosure and together with the description serve to explain the principle of the invention. In the drawings:

FIGS. 1a through 1h illustrate various views of the windshield wiper assembly including a spline, a wiping element, and a component for combining the spline with the wiping element according to a related art;

FIGS. 2a through 2f illustrate various views of the windshield wiper assembly including a spline, a wiping element, and a component for combining the spline with the wiping element according to an embodiment of the present disclosure;

FIGS. 3a through 3f illustrate various views of a spline with two elongate strips according to an embodiment of the present disclosure.

DETAILED DESCRIPTION OF THE INVENTION

Figures 2A, 2B:
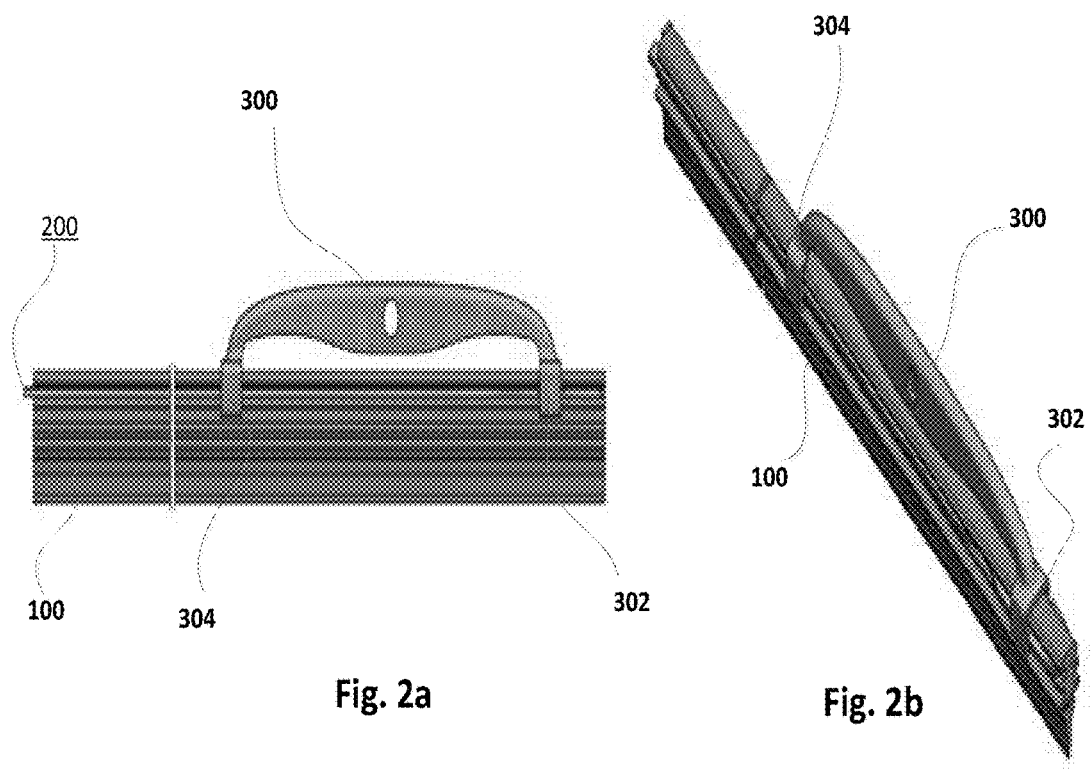

Reference will now be made in detail to the preferred embodiments of the present disclosure, examples of which are illustrated in the accompanying drawings. Wherever possible, the same reference numbers will be used throughout the drawings to refer to the same or like parts.

By way of an example, a spline for use in a windshield wiper assembly and a method for manufacturing the same according to embodiments of the present disclosure will be described in detail with reference to the accompanying drawings.

FIGS. 1a through 1h illustrate various views of the windshield wiper assembly including a spline, a wiping element, and a component for combining the spline with the wiping element according to a related art.

Specifically, FIGS. 1a, 1b, and 1c illustrate a top view, a side view, and a cross-sectional view of the wiper assembly with rectangular-shaped backing strips of FIG. 1e inserted in the compression or injection molded wiping element 100, and FIG. 1d shows a perspective view of a windshield wiper assembly according to a related art. FIGS. 1e, 1f, 1g and 1h illustrate a top view of the spline 150 according to a related art, a top view of the compression or injection molded wiping element 100 with the spline 150 inserted, a side view of the compression or injection molded wiping element 100 with the spline 150 inserted, and a cross-sectional view of the wiping element 100 with the spline 150 of FIG. 1e inserted according to the related art.

As shown in FIG. 1e, a rectangular-shaped backing strip 150 according to the related art has a simple structure without any deformation along the axis of the strip. This simple spline 150 includes a rectangular-shaped notch 152 configured to engage a claw 302 of the component 300 as shown in FIGS. 1a, 1b and 1d for retaining the compression or injection molded wiping element 100, as further described below. Although this type of spline can be produced at a low cost, it generally has inferior retaining properties because of its simple structure.

As such, the rectangular-shaped spline 150 of the related art can be used only for the type of wiping elements formed by an injection molding or a compression molding process. This is because the molded wiping element has "closed ends" 102 and 104 formed on each side of the wiping element 100 as illustrated in FIG. 1g, and these closed ends function to hold the spline 150 at each end of the recesses formed in an upper portion of the wiping element 100. As illustrated in FIG. 1g, longitudinally extending recesses are provided in the upper portion of the compression or injection molded wiping element 100 into which the spline 150 is inserted. The compression or injection molded wiping element 100 further includes a wiping lip 110 at a lower portion of the wiping element 100 as shown in FIG. 1h.

However, the above-mentioned injection and compression molding processes generally require expensive shape dedicated tooling and complicated manufacturing steps, and thus they are not suitable for mass producing various types of wiping elements from a cost and productivity perspective. On the other hand, extruded wiping elements made by an extruded process can be mass produced at a much lower tooling cost for each shape required. However, if the wiping element is extruded, no such "closed ends" can be formed at each side of the wiping element, making it difficult to use such a simple structured spline of FIG. 1e because the spline will not be retained in the wiping element due to the lack of the closed ends.

What is desirable is a spline for use in a wiper assembly that has improved retaining properties while it can be manufactured at a relative low cost without using expensive machinery and complicated process steps.

FIGS. 2a through 2f illustrate various views of the windshield wiper assembly including a spline, a wiping element, and a component for combining the spline with the wiping element according to an embodiment of the present disclosure.

FIG. 2a shows a side view of a wiper assembly, and FIG. 2b illustrates a perspective view of the wiper assembly according to an embodiment of the present disclosure. Referring to FIGS. 2a and 2b, a component 300 represents a frame having a first claw 302 and a second claw 304 that are configured to partially surround an upper portion of a extruded wiping element 100 with a spline 200 inserted in the upper portion of the wiping element 100. FIG. 2c shows a sectional top view along the line A-A' of FIG. 2e, showing an extruded wiping element retained by two elongate strips of FIG. 3a according to an embodiment of the present disclosure.

Figure 3A:
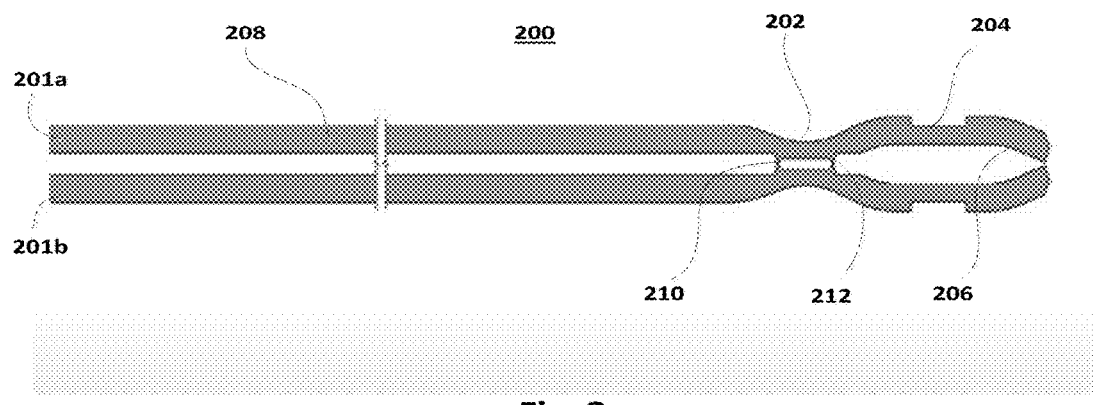

The extruded wiping element 100 is preferably made of an elastic material like rubber, and the spline 200 and the component 300 are preferably made of metal. Referring to FIGS. 2c and 3a, the spline 200 comprises two elongate strips 201a, 201b each having a first curved portion 202 having at least one pointed protrusion and a second curved portion 206 formed at a side of the elongate strip. The second curved portion 206 of each elongate strip cooperates with each other to retain the wiping element 100 at the side of the extruded wiping element 100.

Further, the second curved portion 206 of each elongate strip is adapted to form another protruded portion that engages the extruded wiping element 100 for retaining the extruded wiping element at the side of the elongate strip by a spring action, as shown in FIG. 2c. A more detailed structure of the spline 200 according to an embodiment of the present disclosure is described in detail with reference to FIGS. 3a through 3f.

Referring to FIG. 2c, a sectional top view along the line A-A' of FIG. 2e is shown. The spline of FIG. 3a is inserted into longitudinally extending recesses provided in the upper portion of the extruded wiping element 100. As shown in FIG. 2c, the spline 200 is designed to fixedly retain the extruded wiping element 100 at the first curved portion 202 by the pointed protrusions formed on an outer surface of the first curved portion 202 that are configured to penetrate the extruded wiping element 100. Moreover, the spline 200 is designed to further retain the extruded wiping element 100 at the second curved portion 206 because the second curved portion 206 is configured to form another protruded portion that engages the extruded wiping element 100 at a side of the elongate strip by a spring action for retaining the extruded wiping element 100.

FIG. 2d illustrates a top view of the extruded wiping element with the spline of FIG. 3a inserted, FIG. 2e shows a side view of the extruded wiping element with the spline of FIG. 3a inserted, and FIG. 2f shows a cross-sectional view of the extruded wiping element with the spline of FIG. 3a inserted according to an embodiment of the present disclosure. Referring to FIG. 2f, the extruded wiping element 100 includes a head portion 105 and a blade 110. The head portion 105 is provided with longitudinally extending recesses into which the spline 200 is inserted.

FIGS. 3a through 3f illustrate various views of a spline with two elongate strips according to an embodiment of the present disclosure, and FIGS. 3g through 3l illustrate various views of an overall shape of the spline with a bottom surface of the spline directed toward a wiping lip of the wiping element according to an embodiment of the present disclosure.

Figure 3B:
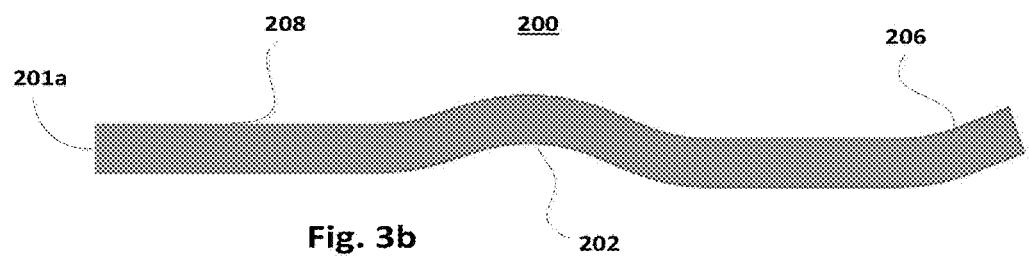
Figure 3C:
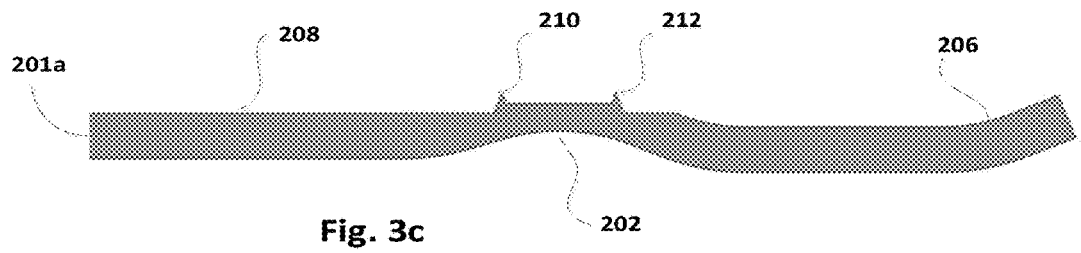

FIG. 3a is a top view of a spline with two elongate strips, and FIGS. 3b, 3c and 3d are schematic top views of portions of an elongate strip and showing process steps for fabricating a spline 200 according to an embodiment of the present disclosure. FIG. 3e illustrates a perspective view of the spline 200 with two pointed protrusions, and FIG. 3f shows a top view of the spline with a plurality of pointed protrusions according to an embodiment of the present disclosure.

Referring to FIG. 3a, two elongate strips 201a and 201b are aligned to face each other. Each strip has a first curved portion 202 including at least one pointed protrusion formed on an outer surface of the first curved portion 202. The second curved portion 206 is provided at a side of the elongate strip to form another protruded portion. The second curved portion 206 of each strip cooperates with each other to retain a wiping element at a side of the wiping element. In an embodiment, a radius of curvature of the first curved portion 202 is substantially the same as a radius of curvature of the second curved portion 206 in making the first and second curved portions.

As shown in FIG. 3a, a spline 200 is composed of a pair of elongate strips that are adapted to seat within a wiping element to be engaged with claws 302/304 of the component 300 as shown in FIGS. 2a and 2b for retaining the extruded wiping element 100. As described above, each elongate strip includes a first curved portion 202 having pointed protrusions 210 and 212. The pointed protrusions 210 and 212 are formed on the outer surface of the first curved portion 202 by carrying out bending and material removing operations. The pointed protrusions 210 and 212 are configured to penetrate the wiping element 100 to fixedly retain the extruded wiping element between two strips 201a and 201b as shown in FIG. 2c.

Each elongate strip of the spline 200 further includes a portion having a rectangular-shaped notch 204 adapted to engage a first claw 302 of the component 300 for retaining the extruded wiping element 100 as shown in FIG. 2a. A second curved portion 206 of the spline 200 is provided at a side of the elongate strip and is adapted to engage into the wiping element 100 for retaining the extruded wiping element at the side of the elongate strip. A body portion 208 is extended from the first curved portion 202 and is configured to seat within the extruded wiping element. The body portion 208 does not require any deformation along the axis of the elongate strip and is engaged with a second claw 304 of the component 300 for retaining the extruded wiping element in cooperation with the first claw 302 of the component 300.

Although two pointed protrusions are shown in FIGS. 3a, 3c, 3d and 3e, the number of the pointed protrusion is not limited to two and more than two pointed protrusions can be formed as shown in FIG. 3f according to an embodiment of the present disclosure. The pointed protrusions 210 and 212 are adapted to penetrate the wiping element 100 for fixedly retaining the wiping element between two elongate strips, thereby improving the retaining properties of the spline 200.

Figure 4:
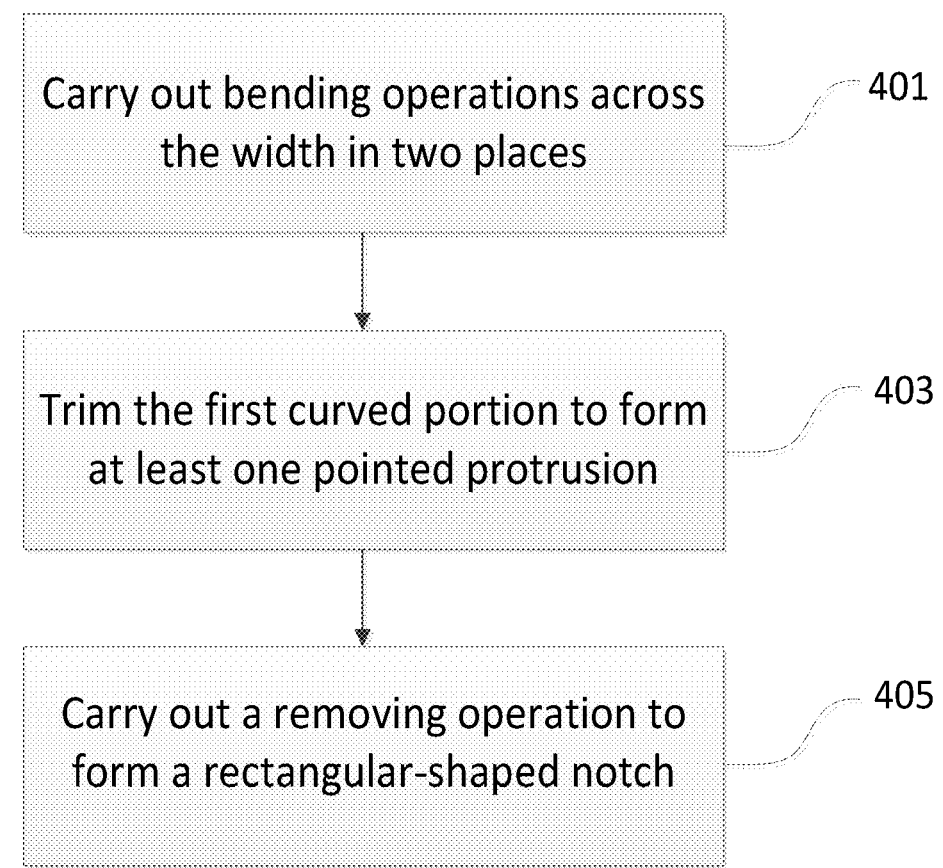
FIG. 4 illustrates a process flow chart showing process steps for fabricating a spline according to an embodiment of the present disclosure.

FIG. 4 illustrates a process flow chart showing process steps for fabricating a spline according to an embodiment of the present disclosure. Referring to FIGS. 3b, 3c, 3d, and 4, a method for forming a spline for use in a windshield wiper assembly is illustrated. By way of an example, a height of the spline is about 0.8 mm and a width of the spline is about 2.5 mm in an embodiment. A blank elongate strip made of metal is provided, and a bending operation is carried out across the width of the blank elongate strip in two places to form a first curved portion 202 and a second curved portion 206 (step 401). Then, a first material removing operation is carried out for forming pointed protrusions 210/212 on an outer surface of the first curved portion of the elongate strip (step 403).

By way of an example, two pointed protrusions are formed as shown in FIG. 3c. However, at least one or more protrusions can be formed as necessary and the number of the pointed protrusion formed on the outer surface of the first curved portion 202 is not limited to two as shown in FIG. 3*f* where more than two pointed protrusions are formed according to an another embodiment of the present disclosure. These pointed protrusions are configured to penetrate the wiping element to fixedly retain the wiping element between the elongate strips. The second curved portion 206 is formed by carrying out the bending operation at a side of the elongate strip. However, no deformation is made to a body portion 208.

Then, a second material removing operation is carried out for forming a rectangular-shaped notch 204 in a portion between the first curved portion 202 and the second curved portion 206 of the elongate strip (step 405). A perspective view of the spline 200 with two pointed protrusions and a rectangular-shaped notch according to an embodiment of the present disclosure is illustrated in FIG. 3*e*.

According to an embodiment of the present invention, an overall shape of the spline is convex or concave with a bottom surface of the spline directed toward a wiping lip of the wiping element as illustrated in FIGS. 3*g* through 3*l*.

Figures 3G, 3H, 3I, 3J, 3K, 3L:
FIGS. 3g through 3l illustrate various views of an overall shape of the spline with a bottom surface of the spline directed toward a wiping lip of the wiping element according to an embodiment of the present disclosure.

FIGS. 3*g*, 3*h* and 3*i* illustrate side views and a perspective view of an overall shape of the spline with a bottom surface of the spline directed toward a wiping lip of the wiping element, and FIGS. 3*j*, 3*k* and 3*l* show a side view, a perspective view, and a cross-sectional view of an overall shape of the spline and wiping element combination with a bottom surface of the spline directed toward a wiping lip of the wiping element, according to an embodiment of the present disclosure.

In an embodiment, a curvature can be provided to the spline along the axis of the spline as shown in FIGS. 3*g* through 3*l*. The extent of the curvature is application specific and thus can vary, for example, from about 1000 mm to about 5000 mm. The curvature can be provided to the spline as a final step after the step 405 is done, or the above-described manufacturing steps 401~405 can be carried out with a pre-bent strip as a starting material. However, the former is desirable because this would allow the manufacturer to finish the spline in a non-bent state and then a desired curvature can be provided as needed.

The spline sits in a groove or a longitudinally extending recess formed in an upper part of the wiping element 100. When the spline is assembled with the wiping element, a bottom surface of the spline is directed downward or toward the wiping lip 110 of the wiping element 100 as shown in FIG. 2*f*. With a curvature provided along the axis of the spline, an overall shape of the spline is concave or convex with a bottom surface of the spline directed toward a wiping lip of the wiping element as shown in FIGS. 3*g*, 3*h*, 3*i*, 3*j* and 3*k*.

As apparent from the foregoing, the present disclosure provides a spline having excellent retaining properties due to the plurality of pointed protrusions formed in the first curved portion and another protruded portion formed by the second curved portion that engages the wiping element at a side of the wiping element.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A spline for use in a windshield wiper assembly including a wiping element and a component having a plurality of claws, the spline being composed of a pair of elongate strips and adapted to seat within the wiping element, each elongate strip comprising:
    a first curved portion having at least one pointed protrusion configured to penetrate the wiping element to retain the wiping element between the elongate strips;
    a notched portion having a rectangular-shaped notch positioned on a side of the elongate strip opposite to the at least one pointed protrusion and adapted to engage with a first claw of the component to retain the wiping element;
    a second curved portion provided at an end of the elongate strip and adapted to engage into the wiping element for retaining the wiping element, the notched portion being located between the first curved portion and the end of the elongate strip; and
    a body portion extended from the first curved portion and adapted to seat within the wiping element to be engaged with a second claw of the component for retaining the wiping element,
    wherein the side of the elongate strip opposite to the at least one pointed protrusion is curved towards the at least one pointed protrusion at the first curved portion.

2. The spline of claim 1, wherein the at least one pointed protrusion includes a plurality of pointed protrusions formed on the first curved portion.

3. The spline of claim 2, wherein the at least one pointed protrusion includes two pointed protrusions formed on opposite ends of the first curved portion.

4. The spline of claim 1, wherein the second curved portion of each elongate strip cooperates with each other to retain the wiping element at opposite sides of the wiping element.

5. The spline of claim 1, wherein the second curved portion of each elongate strip is configured to form another protruded portion that is configured to engage the wiping element for retaining the wiping element.

6. The spline of claim 1, wherein an overall shape of the spline is convex or concave with a bottom surface of the spline directed toward a wiping lip of the wiping element.

7. A sub assembly for a windshield wiper assembly, comprising:
    a wiping element with a wiping lip;
    a component including a first claw and a second claw; and
    a spline composed of a pair of elongate strips and adapted to seat within the wiping element, each elongate strip comprising:
        a first curved portion having at least one pointed protrusion penetrating the wiping element to retain the wiping element between the elongate strips;
        a notched portion having a rectangular-shaped notch positioned on a side of the elongate strip opposite to the at least one pointed protrusion and engaging the first claw of the component to retain the wiping element;
        a second curved portion provided at an end of the elongate strip, the second curved portion engaging the wiping element for retaining the wiping element at the side of the elongate strip, and the notched portion being located between the first curved portion and the end of the elongate strip; and
        a body portion extended from the first curved portion and seated within longitudinally extending recesses formed in the wiping element, the body engaging the second claw of the component for retaining the wiping element, wherein the side of the elongate strip opposite to the at least one pointed protrusion is curved towards the at least one pointed protrusion of the first curved portion.

8. The sub assembly of claim 7, wherein the at least one pointed protrusion includes a plurality of pointed protrusions formed on the first curved portion.

9. The sub assembly of claim 8, wherein the at least one pointed protrusion includes two pointed protrusions formed on opposite ends of the first curved portion.

10. The sub assembly of claim 7, wherein a radius of curvature of the first curved portion is substantially the same as a radius of curvature of the second curved portion.

11. The sub assembly of claim 7, wherein the second curved portion of each elongate strip cooperates with each other to retain the wiping element at opposite sides of the wiping element.

12. The sub assembly of claim 7, wherein the second curved portion of each of the elongate strip is configured to form another protruded portion that engages the wiping element for retaining the wiping element.

13. The sub assembly of claim 7, wherein the wiping element is an extruded wiping element.

14. The sub assembly of claim 7, wherein an overall shape of the spline is convex or concave with a bottom surface of the spline directed toward the wiping lip of the wiping element.

* * * * *